July 26, 1949.   G. D. MOODY   2,477,195
SOLDERING IRON EQUIPMENT
Filed June 27, 1946   2 Sheets-Sheet 1
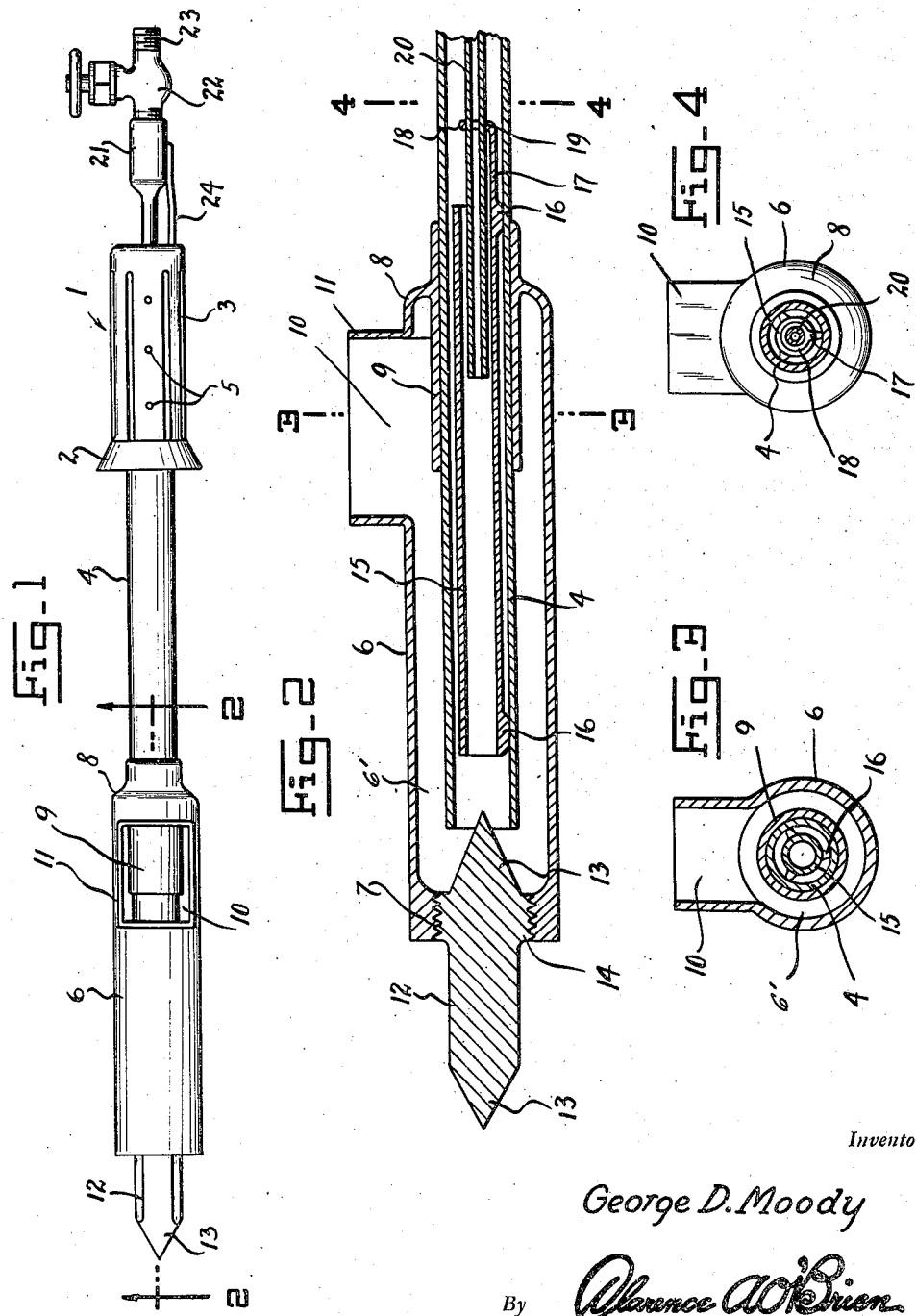
Inventor
George D. Moody
By Clarence A. O'Brien
and Harvey B. Jacobson
Attorneys

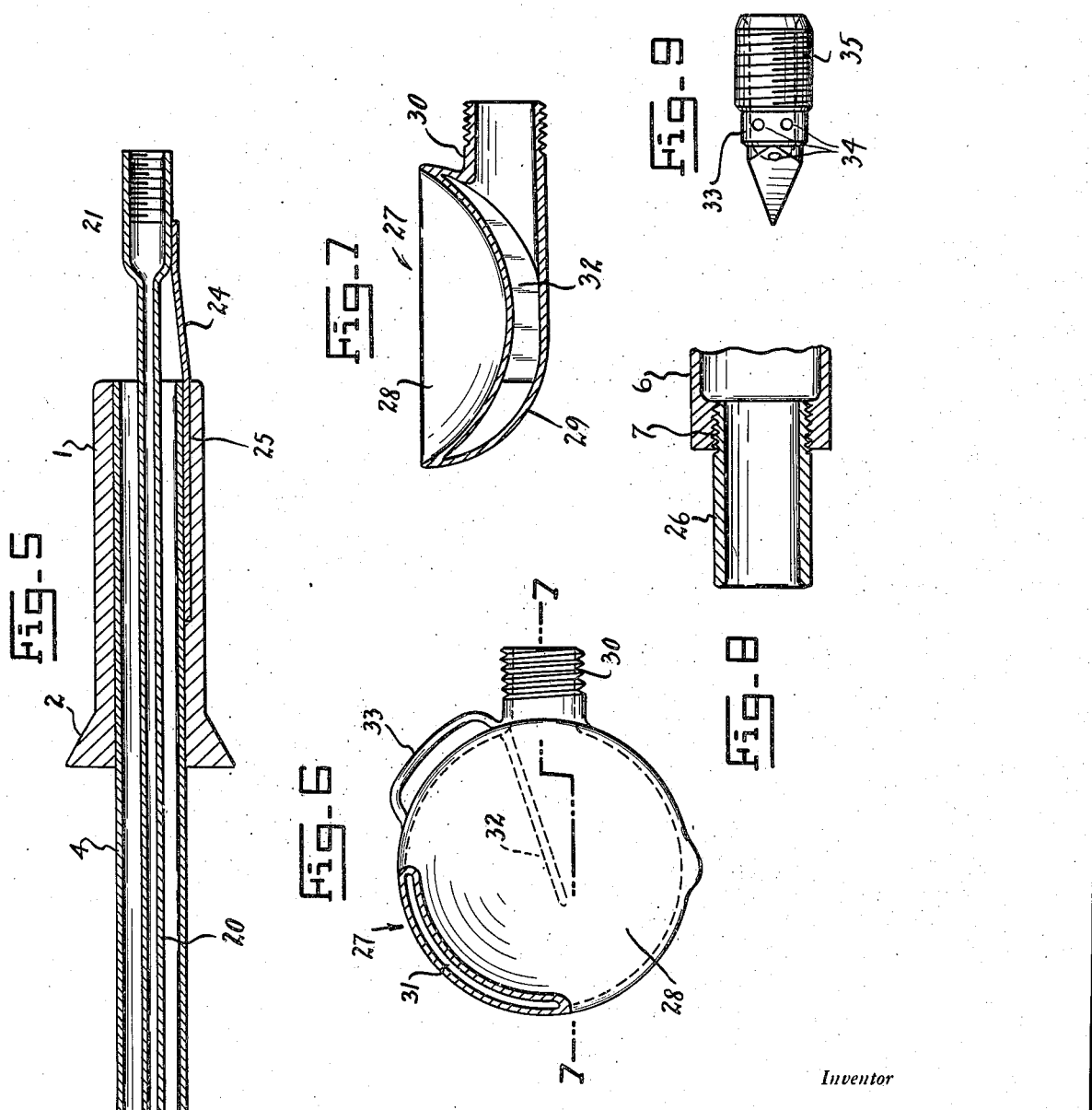

Patented July 26, 1949

2,477,195

UNITED STATES PATENT OFFICE 2,477,195

SOLDERING IRON EQUIPMENT

George D. Moody, Arkansas City, Kans., assignor of one-half to Ralph E. Moody, Arkansas City, Kans.

Application June 27, 1946, Serial No. 679,733

3 Claims. (Cl. 158—26)

My invention relates to improvements in soldering iron equipment, the primary object in view being to provide a simply constructed, easily handled soldering iron adapted for producing a hotter flame than the usual gasoline buring soldering iron, and which will obviate accumulation of soot therein and obnoxious odors, will not readily get out of order and is comparatively inexpensive to manufacture and use.

Another object is to provide a device of the character and for the purpose above set forth which is adapted to be easily and quickly converted into a blow torch.

Still another object is to provide a device of the character designated with equipment adapting the same for use in melting solder quickly and safely.

Other and subordinate objects, also comprehended by my invention, together with the precise nature of my improvements and manifold advantages thereof, will be readily understood when the succeeding description and claims are read with reference to the drawings accompanying and forming part of this specification.

In said drawings:

Figure 1 is a view in side elevation of my improved soldering iron in a preferred embodiment thereof, Figure 2 is a fragmentary view in longitudinal section taken on the line 2—2 of Figure 1 and drawn to a larger scale, Figure 3 is a view in transverse section taken on the line 3—3 of Figure 2, Figure 4 is a similar view taken on the line 4—4 of Figure 2, Figure 5 is a longitudinal section through the handle and through a portion of the shank and the gas feeding tube, Figure 6 is a view in plan, partly broken away and shown in section, of a melting pot attachment to be used in place of the soldering tip, Figure 7 is a view in transverse section taken on the line 7—7 of Figure 6, Figure 8 is a fragmentary view in longitudinal section illustrating the invention equipped for use as a blow torch, Figure 9 is a view in side elevation of a modified embodiment of soldering tip.

Referring to the drawings by numerals, and first to Figures 1 to 5 thereof, according to my invention, a soldering iron is provided comprising a handle 1 of tubular form and any suitable heat-resistant material, with a front end circumferential flange 2 for preventing a hand grasping the handle from slipping forwardly off the same. Flutes, as at 3, may be provided on the handle 1 to facilitate gripping the same.

A tubular shank 4, of suitable metal, extends forwardly from the handle 1 with the rear end portion thereof fitted in said handle 1 and suitably fixed therein as by rivets 5.

At the front end of the shank 4 is an elongated, hollow head 6, generally tubular in form, and substantially larger in diameter than the shank 4. The head 6 is provided with a reduced, internally threaded, front end bore 7, a rear end wall 8, a reduced rear end, concentric sleeve 9 on which the wall 8 forms a flange, and a rear end side vent 10 with a flange 11 around the same and for a purpose presently seen. The head 6 surrounds a substantial front end portion of the shank 4 with the sleeve 9 fitting on said shank and suitably secured to the same, and with the front end of the head spaced forwardly of the front end of the shank as shown in Figure 2. As will presently more clearly appear, the head 6 forms a combustion chamber 6' therein forwardly of the shank 4 and surrounding that portion of said shank contained in said head and in the sleeve 9.

A soldering tip 12 with coned ends 13 is detachably secured in the bore 7 by a threaded rear end collar 14 on the tip, and with a rear end extended slightly into the front end of the shank 4.

Suitably fixed in the front end portion of the shank 4 is a shorter and a smaller diameter air and fuel mixing tube 15, the front end of which is designed to be spaced from the front end of the shank 4 for a purpose presently clear. External lugs 16 circumferentially spaced around the front and rear ends of the air and fuel mixing tube 15 space said tube in the shank 4 concentrically therein. A tail piece 17 extends rearwardly from the air and fuel mixing tube 15 with a right angled terminal 18 aperture, as at 19, in the axis of said tube and the function of which will presently be seen. A fuel feeding tube 20, substantially smaller in diameter than the air and fuel mixing tube 15, extends forwardly into the shank 4 with the rear end thereof extending rearwardly out of the shank 4 and the handle 1 and the front end portion thereof extended into the rear end of the air and fuel mixing tube 15. The rear end of the fuel feeding tube 20 has the form of an enlarged socket 21 in which is threaded one end of a fuel feed control valve 22, the other threaded end 23 of which is adapted to be suitably connected to a fuel supply source, not shown.

The fuel feeding tube 20 and handle are slidably connected for endwise adjustment relatively forwardly and rearwardly, by grasping the handle 1 and the valve 22, to variably position the front end portion of said tube 20 in the rear end of the air and fuel mixing tube 15. For this purpose, a bar 24 is suitably fixed at one end, as by welding, not shown, to the socket 21 to incline forwardly therefrom with a free portion frictionally slidable in an internal, longitudinal, groove 25 provided in the handle 1 between said handle and the shank 4. At the front end thereof the fuel feeding tube 20 is slidably extended through the aperture 19 of the terminal 18 of the tail piece 17 to be guided in and supported by said tail piece and suitably held in said tube 15. Thus, as will be seen, the bar 24 and the tail piece 17 support the fuel feeding tube 20 in the shank 4 concentrically thereof and concentrically of the air and fuel mixing tube 15, and so that the fuel feeding tube 20 may be adjusted endwise and through the tail piece 17 to correspondingly adjust the front end of said tube 20 in the rear end of the air and fuel mixing tube 15.

Referring now to the use and operation of the invention as so far described. The valve 22 is designed to be connected to a source, under pressure, not shown, of "Butane" or "Propane" gas which, under control of said valve, issues from the front end of the fuel feeding tube 20 into the air and fuel mixing tube 15 where it is mixed with air to form a mixture which, when ignited, will burn with a hot flame in the air and fuel mixing tube 15 and in the combustion chamber 12, the products of combustion escaping out of the vent 10. The air enters the shank 4 by way of the rear end thereof and, under the velocity of the gas issuing from said tube 20, is sucked into the air and fuel mixing tube 15 to pass therethrough at a higher velocity than obtains in the shank 4 behind said tube 15 because of the restricted space formed between the front end portion of the fuel feeding tube 20 and the rear end portion of the air and fuel mixing tube 15 which comprises a restricted throat acting in a manner similar to a "Venturi" tube. As the mixture and flame issue from the air and fuel mixing tube 15, air is drawn along the outside of said tube 15 to further facilitate combustion. Thus, air is drawn completely through the shank 4 to cool the same. By varying the position of the fuel feeding tube 20 in said mixing tube 15, the mixture may be varied by varying the extent of the restricted air space between said tube 20 and said tube 15, thus varying the amount of and velocity of air passing through such space. As will be clear, the fuel feeding tube 20, the air and fuel mixing tube 15 and the front end portion of the shank 4 form, in effect, a blow torch to heat the tip 12.

As shown in Figure 8, a nipple 26 may be substituted at the front end of the head 6 for the tip 12, by threading said nipple in the bore 7. Thus, the described device may be used as a blow torch, proper, with the flame issuing from said nipple 26.

As shown in Figures 6 and 7, my invention comprehends as optional equipment for the described soldering iron, a melting pot 27 for attachment to the head 6 to melt solder therein. The melting pot 27 is of cup-like form and double walled construction with inner and outer walls 28, 29 and a bottom side nipple 30 communicating with the space between said walls 28, 29 and adapted to be threaded into the bore 7 of the head 6. The walls 28, 29 converge, toward and merge into each other at the rim of the pot 27 and said rim is formed with an arcuate vent 31 therein. A baffle wall 32 extends diagonally between the walls 28, 29 across the inner end of the nipple 30 to prevent products of combustion and flame issuing from said nipple into the space between the walls 28, 29 discharging directly out of said vent 31. A handle 33 is provided on one side of the melting pot 27 for manipulating the same. The manner in which the described melting pot is designed to be used in attachment to the head 6 will be manifest.

As shown in Figure 9, a hollow tip 33 is provided, with outlet apertures 34 therein and which is threaded, as at 35, for turning into the bore 7 of the head 6 in substitution of the tip 12. The hollow tip 33 is designed for quicker heating than the solid tip 12 and for preheating work while at the same time soldering, the apertures 34 permitting the escape of heat directly out of the tip to faciliate heating the work.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

What I claim is:

1. In a device of the class described, a tubular handle, a tubular shank having a rear end fitted and fixed in said handle and open for the passage of air forwardly through said shank, a relatively shorter air and fuel mixing tube in the front end portion of said shank relatively smaller in diameter and spaced from said portion to provide an air passage between the same and said portion and with a front end spaced from the front end of said shank and opening directly into the same, means to introduce vapor fuel from a source under pressure through said shank from the rear end thereof to discharge in jet form into the rear end of said air and fuel mixing tube, a hollow vented head on the front end portion of the shank surrounding the same and forming a combustion chamber into which the front end of the shank opens, and a soldering tip attached to said head and extending into said chamber.

2. In a device of the class described, a tubular handle, a tubular shank having a rear end fitted and fixed in said handle and open for the passage of air forwardly through said shank, a relatively shorter air and fuel mixing tube in the front end portion of said shank relatively smaller in diameter and spaced from said portion to provide an air passage between the same and said portion and with a front end spaced from the front end of said shank and opening directly into the same, means to introduce vapor fuel from a source under pressure through said shank from the rear end thereof to discharge in jet form into the rear end of said air and fuel mixing tube, a hollow vented head on the front end portion of the shank surrounding the same and forming a combustion chamber into which the front end of the shank opens, and a soldering tip attached to said head and extending into said chamber, said means comprising a valved fuel feeding tube of relatively smaller diameter than said fuel mixing tube and extending into said shank from the rear end thereof and partway into said air and fuel mixing tube to form a restricted air space between the same and said air and fuel mixing tube and cause the fuel issuing therefrom to create suction in said air and fuel mixing tube in front of said restricted air space.

3. In a device of the class described, a tubular handle, a tubular shank having a rear end fitted and fixed in said handle and open for the passage of air forwardly through said shank, an air and fuel mixing tube in the front end portion of said shank relatively smaller in diameter and spaced from said portion to provide an air passage between the same and said portion, means to introduce vapor fuel from a source under pressure through said shank from the rear end thereof to discharge in jet form into the rear end of said air and fuel mixing tube, a hollow vented head on the front end portion of the shank surrounding the same and forming a combustion chamber into which the front end of the shank opens, and a soldering tip attached to said head and extending into said chamber, said means comprising a valved fuel feeding tube of relatively smaller diameter than said fuel mixing tube and extending into said shank from the rear end thereof and partway into said air and fuel mixing tube to form a restricted air space between the same and said air and fuel mixing tube, said fuel feeding tube being endwise slidable from the rear of said shank to vary the position of the same in said air and fuel mixing tube and thereby vary the extent of said restricted air space.

GEORGE D. MOODY.

REFERENCES CITED

The following references are of record in the file of this patent:

UNITED STATES PATENTS

| Number | Name | Date |
| --- | --- | --- |
| 774,064 | Gilbert | Nov. 1, 1904 |
| 1,132,969 | Paul | Mar. 23, 1915 |
| 1,237,460 | Bishop | Aug. 21, 1917 |
| 1,548,447 | Dice | Aug. 4, 1925 |
| 1,562,047 | Peterson | Nov. 17, 1925 |
| 1,808,562 | Lutgert | June 2, 1931 |
| 1,944,860 | Cohan | Jan. 23, 1934 |
| 2,030,238 | Brown | Feb. 11, 1936 |
| 2,261,015 | Brody | Oct. 28, 1941 |